Aug. 14, 1962     C. W. WEBSTER     3,049,332
HIGH PRESSURE VALVE, SHANK AND STEM ASSEMBLY
Filed Nov. 28, 1961
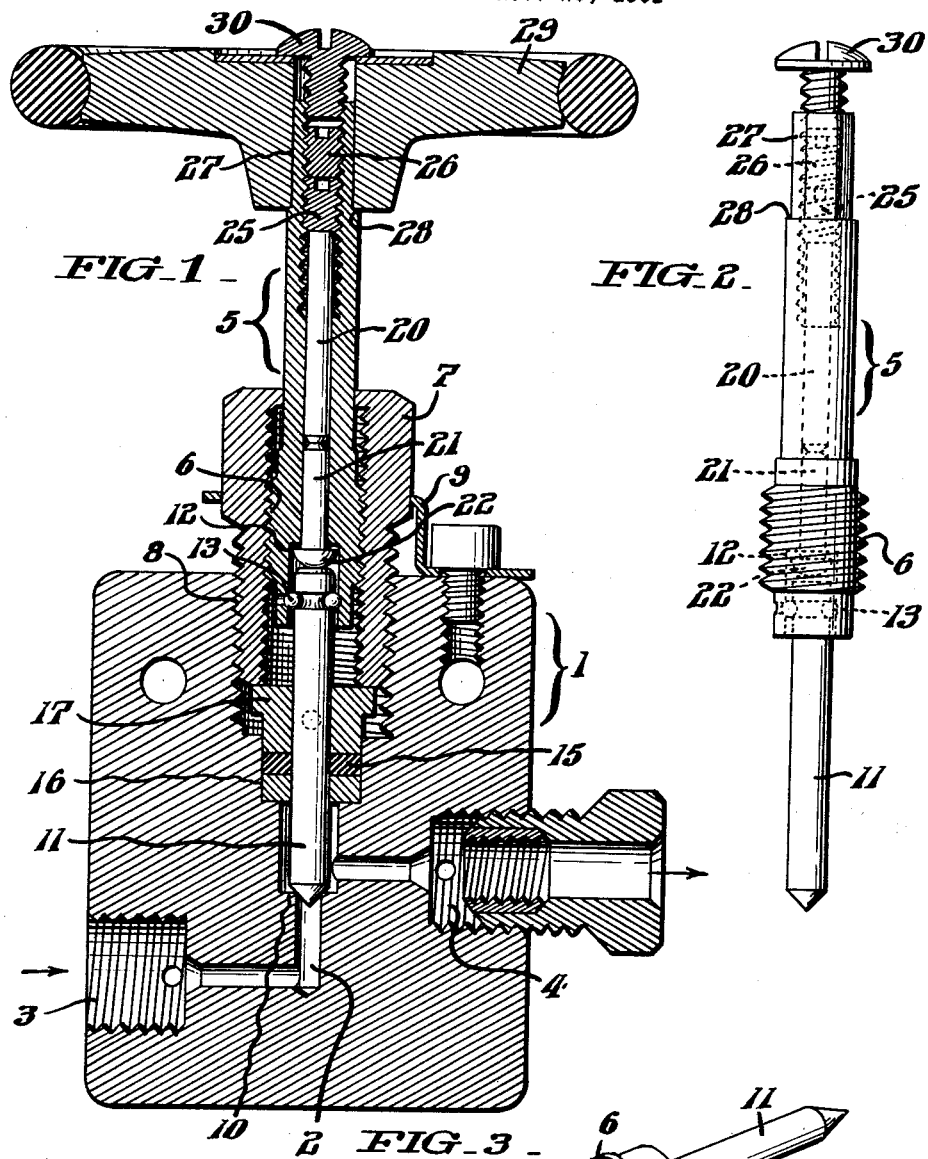
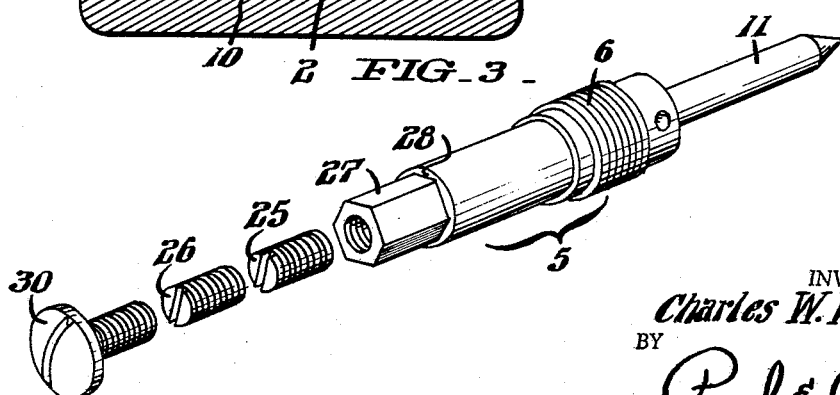
INVENTOR.
*Charles W. Webster,*
BY
*Paul & Paul*
ATTORNEYS.

3,049,332
HIGH PRESSURE VALVE, SHANK AND STEM ASSEMBLY

Charles W. Webster, Hatboro, Pa., assignor to Tri-Kris Company, Inc., Lansdale, Pa., a company of Pennsylvania
Filed Nov. 28, 1961, Ser. No. 155,388
4 Claims. (Cl. 251—88)

This invention relates to valves. More particularly, it is concerned with hand valves of the pin type intended for use in high pressure fluid systems.

My invention has for its chief aim the provision, in connection with such valves, of improved simple and reliable means by which wear can be taken up from time to time without the necessity for disassembling the valves.

How the foregoing and other objects and other attendant advantages are realized in practice, will appear from the following detailed description of the attached drawings wherein:

FIG. 1 is an axial section of a valve constructed in accordance with my invention;

FIG. 2 is an elevational view of the operating means of the valve; and

FIG. 3 is an exploded view in perspective of said operating means.

As herein exemplified, the valve of my invention comprises a block-like body 1 with a staggered angular passage 2 therein, transversely between an inlet 3 and an outlet 4 which, respectively, are internally threaded for connection of piping.

For control of fluid flow through the valve, I have provided a multipartite closure operating means which is separately illustrated in FIGS. 2 and 3, and comprises a cylindrical sleeve member 5 which is threaded externally adjacent its bottom end as at 6 for engagement into an internally threaded gland nut 7 screwed into a tapped bore 8 in the top of the body 1, and is secured against rotation after adjustment by a keeper clip 9. Arranged to cooperate with the seat 10 in the passage 2 is a closure stem in the form of a pin 11 whereof the bottom end is tapered. As shown, the upper end of the pin 11 extends into a counterbore 12 at the bottom end of the sleeve 5 and is there coupled with said sleeve by bearing balls 13 constrained between raceways formed respectively in said pin and said sleeve. Leakage about the closure pin 11 is prevented by a surrounding packing gasket 15 (which may be of Teflon or the like) recessed into a smaller plain bore extension 16 at the bottom of the threaded bore in the valve body, and compressed by a metallic collar 17 interposed between the gland nut 7 and said gasket. Slidably disposed within the sleeve 5 is a shank insert composed of two aligned pins 20 and 21 of which the lowermost one 21 has a rounded head 22 for point contact only with the top end of the closure pin 11. Threaded into the upper end of the sleeve 5 is a screw plug 25 which bears upon the top end of the upper shank pin 20, said screw plug being backed by a locking or jamb screw plug 26 likewise threaded into the sleeve. The upper or distal end of the sleeve 5 is polygonally configured as at 27 down to a stop shoulder 28 for connection thereto of a hand wheel 29 whereof the axial opening is shaped to fit snugly onto the polygonal end portion of the sleeve. As shown, the hand wheel 29 is held in place by a cap screw 30 of which the shank engages into the top end of the sleeve 5 but does not reach to the screw plug 26 with consequent provision of a clearance between the two.

Operation

As the hand wheel 29 is turned, the closure system of the valve will be raised by the action of the threads 6 on the sleeve 5, with attendant lifting of the closure pin 11 from the seat 10 to permit fluid flow between the inlet 3 and the outlet 4 via the transverse passage 2. It is to be noted that during this action and also inclosing the valve, due to the connection of the closure pin 11 to the actuating sleeve 5 by the ball bearing 13, the movement imparted to said pin is in the axial direction only. When wear is to be compensated for, as may be necessary from time to time, this is accomplished by first removing the cap screw 30 whereupon access is readily had into the top end of the sleeve 5 for removal of the jamb or lock screw plug 26 by means of an ordinary screwdriver. With the lock screw 26 removed, the screw plug 25 can be tightened to the required extent and fixed against subsequent accidental displacement by replacement of the jamb screw plug 26 after which the retaining cap screw 30 is re-applied to secure the hand wheel 29. Accordingly, compensation for wear is made possible without necessitating disassembling of the valve.

While the preferred embodiment of this invention has been described in some detail, it will be obvious to one skilled in the art that various modifications may be made without departing from the invention as hereinafter claimed.

Having thus described my invention, I claim:

1. In a valve having a body with a flow passage between a fluid inlet and a fluid outlet, and a closure seat in said passage: operating means including a cylindrical sleeve with external threads at the bottom end thereof engaged with internal threads of a packing gland screwed into the valve body, said sleeve protruding upwardly beyond the valve body; a closure stem in the form of a pin with a tapered bottom end adapted to close down against the seat in the transverse passage aforesaid, the upper end of said pin engaging partway into the bottom of the sleeve and being there connected to said sleeve by a ball bearing; a backing pin axially slidable within the sleeve and bearing upon the closure pin from above; a wear take-up plug screw threadedly engaged within the top end of the sleeve; and a locking plug screw similarly engaged within the top end of the sleeve and backing the take-up screw from above, said wear take-up and locking screws being accessible without necessitating disassembling of the valve.

2. A valve characterized as in claim 1, wherein one end of the backing pin is rounded for point contact only with the confronting end of the closure pin.

3. A valve characterized as in claim 1, wherein the backing pin is composed of plural sections.

4. A valve characterized as in claim 1, wherein the top end of the sleeve is polygonally configured down to a stop shoulder, and further including an actuating hand wheel with a polygonally configured central aperture to fit the polygonal top end portion of the sleeve; and a wheel securing cap screw whereof the shank engages into the sleeve but terminates short of the locking plug screw.

References Cited in the file of this patent

UNITED STATES PATENTS 2,976,069    Meredith _____ Mar. 21, 1961

FOREIGN PATENTS 1,203,049    France _____ July 22, 1959